United States Patent

[11] 3,621,456

| [72] | Inventor | Charles Gilbert Young |
| | | Southwood Road, Storrs, Conn. 06268 |
| [21] | Appl. No. | 809,641 |
| [22] | Filed | Mar. 24, 1969 |
| [45] | Patented | Nov. 16, 1971 |

[54] DISC LASER SYSTEM
12 Claims, 14 Drawing Figs.

| [52] | U.S. Cl. | 331/94.5, 330/4.5 |
| [51] | Int. Cl. | H01s 3/02, H01s 3/06 |
| [50] | Field of Search | 331/94.5; 330/4.5 |

[56] References Cited
UNITED STATES PATENTS

| 3,414,835 | 12/1968 | Miller | 331/94.5 |
| 3,487,330 | 12/1969 | Gudmundsen | 331/94.5 |
| 3,500,231 | 3/1970 | Tomiyasu et al. | 331/94.5 |

*Primary Examiner*—Ronald L. Wibert
*Assistant Examiner*—F. L. Evans
*Attorney*—Lane, Aitken, Dunner & Ziems

ABSTRACT: This specification discloses a disc laser system in which discs of laser glass are mounted in plates arranged in a parallel spaced relationship to permit coolant to flow therebetween. The discs are aligned in a plurality of rows and a laser cavity is made to extend through the rows in series. Elongated flash lamps extend parallel to the rows to excite the laser glass of the discs. The plates contain reflective surfaces to reflect pump light in a way to maximize the percentage of pump light entering the laser discs.

INVENTOR
C. G. YOUNG

BY Lane, Aitken, Dunner & Ziems
and William C. Nealon
ATTORNEYS

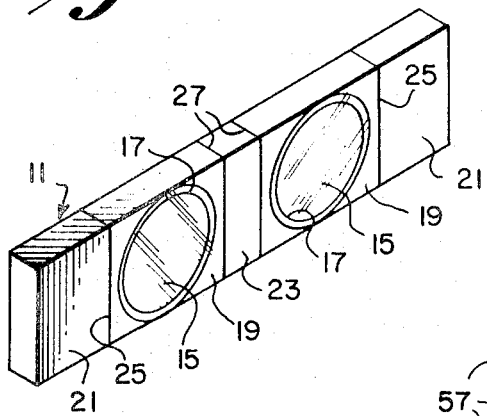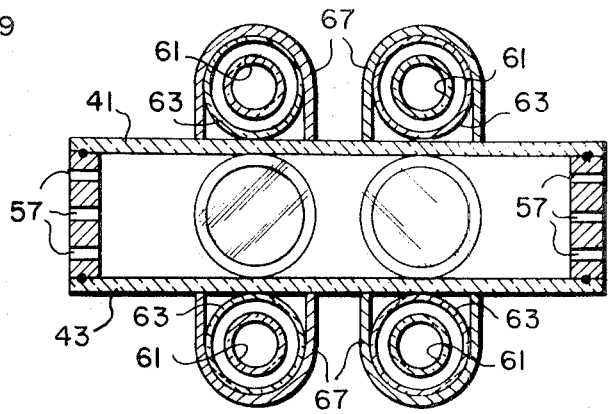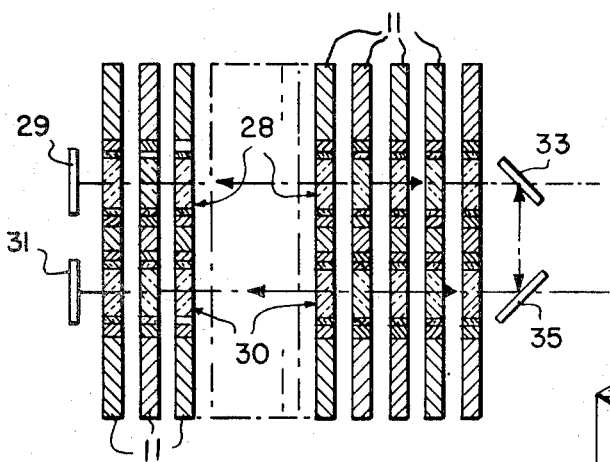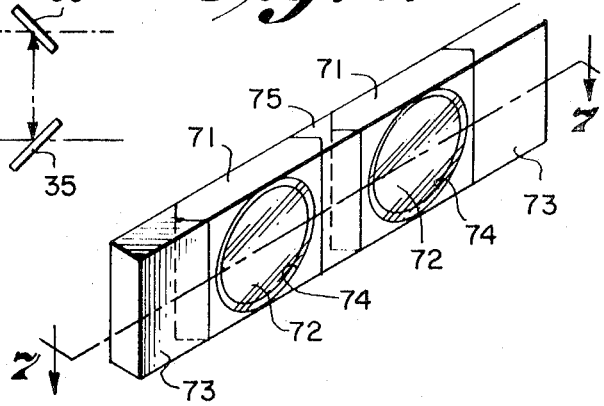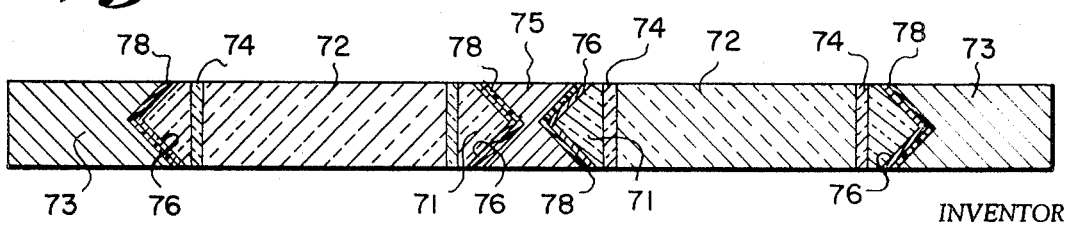

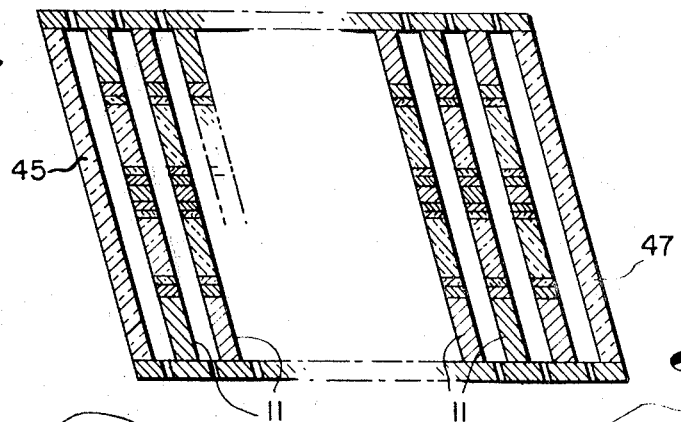
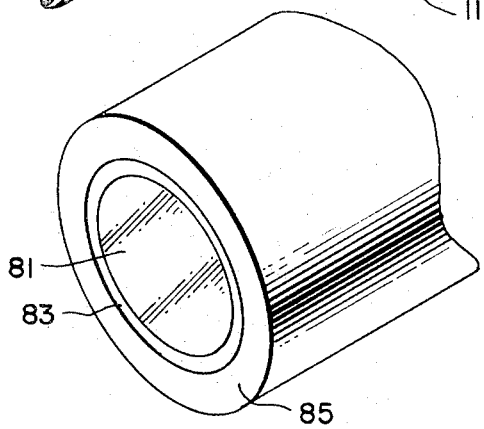
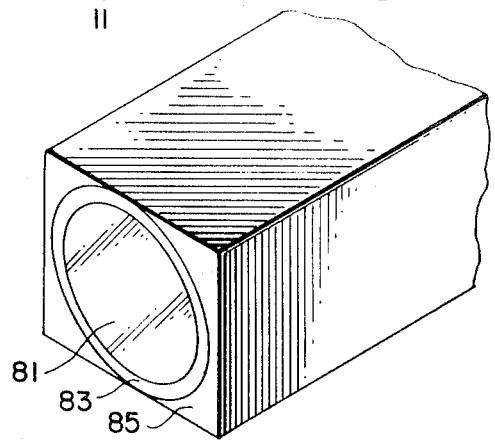
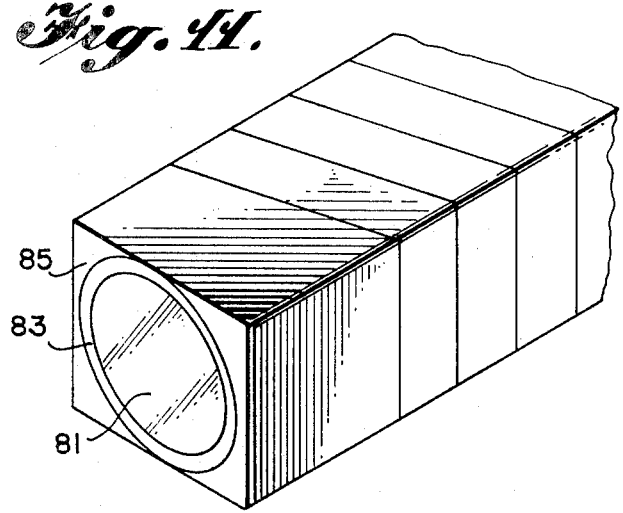
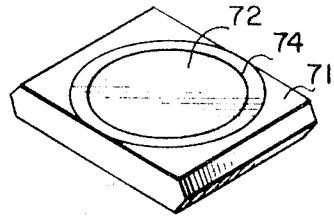
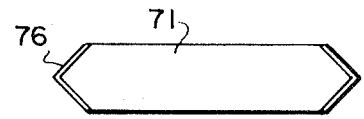
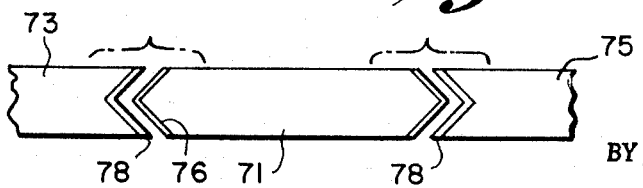
INVENTOR
C. G. YOUNG 3,621,456

DISC LASER SYSTEM

BACKGROUND OF THE INVENTION

This invention relates to glass lasers and, more particularly, to a glass disc laser system with improved means for directing pump light into the laser discs.

Glass laser material is normally excited to a state in which it will amplify light by being irradiated with high intensity light produced by inert gas flashlamps. This excitation of the laser glass is called "pumping" and the light which excites laser glass is called "pump light." The pumping of the laser glass not only excites the laser glass but also introduces heat into the laser glass. Because the laser glass has low terminal conductance, the cooling of the laser glass is a substantial problem. In one method of attacking the cooling problem, the discs of laser glass positioned on a common axis are used in place of the usual rod of laser glass in the laser cavity. Cooling fluid is flowed between the discs to maintain the discs at a low temperature even though the discs are pumped at a high rate. Mirrors are provided to direct the laser light sequentially through all of the rows so that the laser cavity includes all of the rows of discs. The discs are mounted in plates which in turn are mounted in a container. Each plate contains a plurality of the laser discs, one disc in each of the rows. The plates promote laminar flow of the cooling fluid between the discs and thus make possible a higher rate of fluid flow without turbulence thereby permitting more effective cooling of the discs.

SUMMARY OF THE INVENTION

The system of the present invention is an improvement over the above-described disc laser system. In the above-described laser system, elongated flashlamps are positioned above and below the rows of discs to pump the laser glass of the discs to an excited state. The improvement of the present invention provides reflecting interfaces in the plates so that a higher percentage of the pump light produced by the flashlamps is caused to enter into the laser glass of the discs. The reflecting interfaces are provided on opposite sides of each disc running from the top to the bottom of the plate. In one embodiment, the reflecting interfaces are provided by utilizing glass of different indices of refraction to comprise each plate. In another embodiment, the reflecting interfaces are provided by silvering the edges of glass sections of the plates containing the discs.

Accordingly, an object of the present invention is to provide an improved glass disc laser system.

Another object of the present invention is to provide a glass disc laser system in which the percentage of pump light which enters into the laser discs is increased.

Further objects and advantages of the present invention will become readily apparent as the following detailed description of the present invention unfolds and when taken in conjunction with the drawings.

BRIEF DESCRIPTION OF THE DRAWINGS

FIG. 3 is a perspective view of a plate containing laser discs used in the embodiment shown in FIGS. 1 and 2;

FIG. 4 is a sectional view taken along the lines 4—4 of FIG. 2;

FIG. 5 is a schematic illustration of the laser system of the embodiment shown in FIGS. 1-4 illustrating its operation;

FIG. 6 is a perspective view of a plate containing laser discs used in another embodiment of the present invention;

FIG. 7 is a sectional view taken along the lines 7—7 of FIG. 6;

FIG. 8 is a sectional view similar to that shown in FIG. 2 illustrating an alternative embodiment of the present invention; and FIGS. 9-14 illustrate how the plates illustrated in FIGS. 6 and 7 can be manufactured.

DESCRIPTION OF THE PREFERRED EMBODIMENTS

Figure 1:
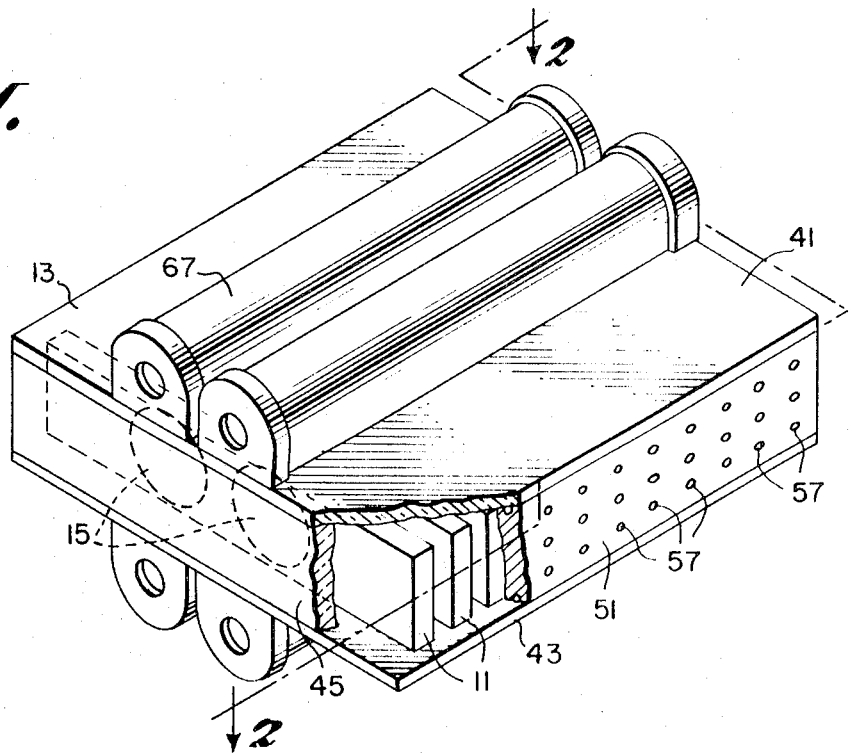
FIG. 1 is a perspective view partially broken away of one embodiment of the present invention.

In the embodiment of the invention illustrated in FIGS. 1-5, plates 11 disposed parallel with one another are mounted in a container 13. The plates 11 are identical and their structure is best depicted in FIG. 3, which is a perspective view of one of the plates. The plates each contain two discs 15 of glass laser material such as neodymium doped glass. The discs 15 extend through the plate with their axes parallel to one another and are located on opposite sides of the plate equidistant from the ends of the plate. Each of the discs 15 is clad with an annulus 17 of material lossy at the emission wavelength, but transparent to the pump wavelengths, such as samarium doped glass. The composite structure of a disc 15 and an annulus 17 is mounted in a cylindrical bore in the plate which is sized to fit the composite structure. The remainder of each of the plates is made of light transmissive glass comprising sections of different indices of refraction. The composite structure of the discs 15 and the annuli 17 are received in square sections 19 of the plate, which sections have a higher index of refraction than the remaining sections 21 and 23 which form the ends and middle of the plate respectively. The different parts of the plate are fused together into a unitary composite whole. The interfaces 25 between the sections 19 and the sections 21 and the interfaces 27 between the sections 19 and the section 23 define planes parallel to the axes of the discs 15.

FIG. 5 is a schematic illustration with the container removed showing how the system operates to generate a laser beam. As shown in FIG. 5, the arrangement of the plates orients the discs 15 into two parallel rows 28 and 30 each aligned on a common axis. A mirror 29 is positioned on the common axis of the row 28 perpendicular to this axis. This mirror 29 will be positioned outside of the container 13, which is not shown in FIG. 5. On the same side of the set of plates 11 another mirror 31 is positioned on the common axis of the other row 30 of discs perpendicular to this common axis. The mirror 31 is also positioned outside the container 13. The mirrors 29 and 31 reflect light travelling through the discs parallel to their common axes back through the discs maintaining parallelism with the common axes. At the other end of the set of plates 11 on the common axes of the discs of rows 28 and 30 are two mirrors 33 and 35 respectively. The mirror 33 is positioned at a 45° angle with respect to the common axis of the row 28 to reflect light travelling through the discs of row 28 to the mirror 35 and to reflect light received from the mirror 35 to pass through the discs of row 28. Similarly, the mirror 35 is positioned at a 45° angle with respect to the common axis of the discs of row 30 to reflect light travelling through the discs of row 30 to the mirror 33 and to reflect light received from the mirror 33 to pass through the discs 15 of row 30.

When the laser material if the discs 15 has been excited, the laser material will emit the light of a particular wavelength, which for glass doped with neodymium is normally a wavelength of 1.06 microns. When light of this wavelength travels through the laser material it induces further emissions of light of the same wavelength, which further emissions will be in phase with the inducing light. As a result light of this wavelength travelling through the excited laser material will experience amplification. Light which is of the proper wavelength to be amplified by the excited laser material is referred to as laser light. A laser light ray travelling through the discs 15, which is not parallel to the common axis of the discs, will interact with the lossy material of the annuli 17 of the discs and will be suppressed. The laser light, however, travelling parallel to the axis of the discs will be amplified as its travels through each successive disc and upon being reflected from either the mirror 29 or 31 will be reflected back through the discs for further amplification. Such laser light upon being reflected by the mirrors 33 and 35 will be transferred to the other row of discs for further amplification. As a result a standing wave of high-intensity laser light, referred to as laser oscillations, will be set up between the mirrors 29 and 31. The optical path between the mirrors 29 and 31 is referred to as the laser and the mirrors 29 and 31 are said to define this laser cavity. One of the mirrors 29 and 31 is made partially transmissive so that some of the light from the laser oscillations will pass through the mirror to a target to be utilized. The other one of the mirrors 29 and 31 and the mirrors 33 and 35 are made as near to 100 percent reflective at the wavelength of the laser light as is possible.

Figure 2:
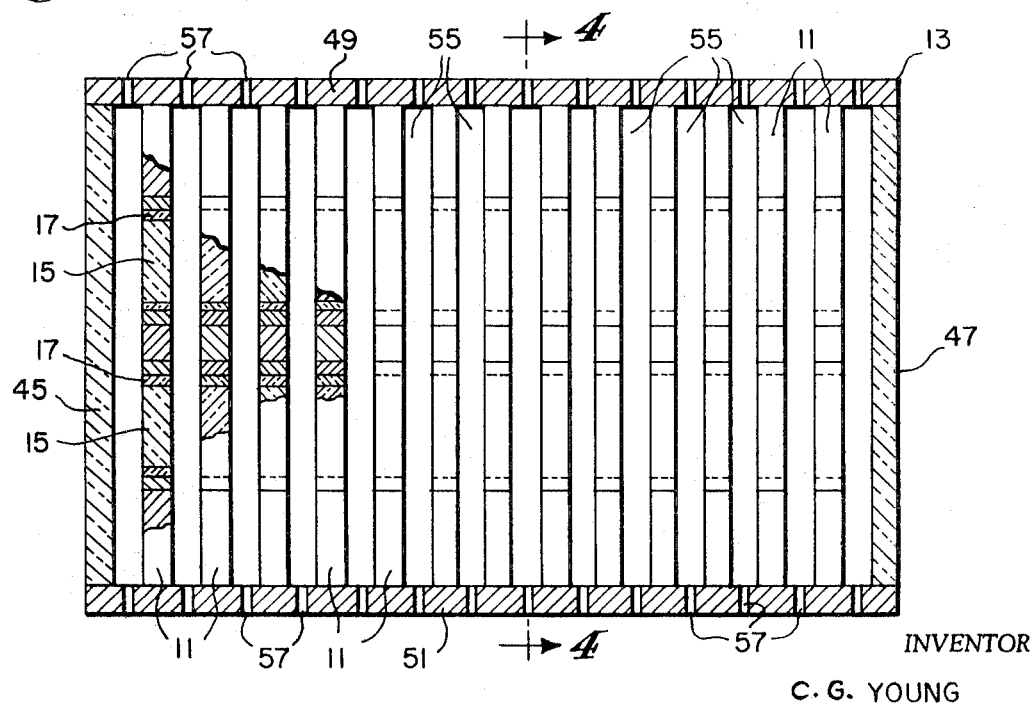
FIG. 2 is a sectional view taken along the lines 2—2 of FIG. 1.

The upper and lower walls of the container 13 as best shown in FIGS. 1 and 3 comprise transparent glass plates 41 and 43. The end walls 45 and 47 of the container 13 as shown in FIGS. 1 and 2 are also made of transparent glass in order to transmit the laser oscillations between the discs 15 and mirrors 29, 31, 33 and 35. The sidewalls 49 and 51 extending parallel to the axes of the discs 15 are made of metal.

The plates 11 extend from the sidewall 49 to the sidewall 51 and from the top plate 41 to the bottom plate 43. As a result oblong cavities 55 are defined within the container 13 among the plates 11 and between the plates 11 and the end walls 45 and 47. Apertures 57 are defined through the metallic sidewalls 49 and 51 communicating with the cavities 55, three apertures being cut in each sidewall communicating with each cavity. A cooling fluid is caused to flow into the cavities 55 through the apertures 57 in one of the sidewalls 49 and 51, then through the cavities 55, and then out through the apertures 57 in the other of the sidewalls.

Four elongated flashlamps 61 are mounted on the container 13 extending parallel with the rows of discs 15. Two of the lamps 61 are mounted directly above and below each of the rows of discs 15. These lamps 61 are for pumping the laser material of the discs 15 to an excited state, in which they will amplify and emit laser light.

The lamps 61 are each centered in glass tubular casings 63, which define with the outer glass wall of the lamps 61 a water jacket surrounding the flashlamps 61. Water is flowed through these water jackets to cool the lamps 61. Surrounding the casings 63 are reflectors 67 for reflecting the light from the flashlamps 61 to the plates 11 and the discs 15. The reflectors 67 have sidewalls which extend down to the top and bottom glass plates 41 and 43 so as to increase the amount of light from the lamps which reaches the discs 15. Light from the flashlamps 63 passes through the water jackets surrounding the lamps and through the transparent top and bottom walls 41 and 43 into the sections 19 of the plates 11 and into the discs 15 to excite the laser material of the discs. This process of pumping the discs heats the discs 15 as well as excites them. This heating of the laser material of the discs limits the rate at which energy can be introduced into the discs 15 to pump them. The cooling fluid, which is flowed through the cavities 55 to cool the discs 15, makes it possible to pump the laser material of the discs at a higher rate.

It is important to maximize the percentage of the pump light produced by the flashlamps 61 entering and exciting the discs 15. For this reason, the reflectors 67 are provided, and also for this reason, the composite structure of the plates 11 described above is used. As has been described above, the sections 19 of each of the plates has a higher index of refraction than the remaining sections 21 and 23. As a result pump light which strikes the interfaces 25 and 27 at low angles of incidence will be reflected and will have a better chance of entering the laser material of the discs 15 either directly after one reflection from the interfaces or after being further reflected from one of the reflectors 67. Because the interfaces 25 and 27 are straight, whereas the interfaces between the section 19 and the annulus 17 and between the disc 15 and the annulus 17 are curved, a large amount of light enters the discs 15 without suffering total internal reflection at the curved interfaces. In this manner, the percentage of the light produced by the lamps 61 which enters the discs 15 is maximized.

FIGS. 6 and 7 illustrate the details of plates containing laser discs to be used in an alternative embodiment of the present invention. The plates shown in FIGS. 6 and 7 will be mounted in a container 13 in the same manner that the plates 11 in the embodiment of FIGS. 1-5 are mounted in the container and flash lamps for pumping the discs of the plates also will be provided in the same manner.

As shown in FIGS. 6 and 7, the plate of this embodiment comprises transparent glass sections 71 positioned on opposite sides of the plate spaced from the ends thereof. In these plates are mounted discs 72 of laser glass clad with annuli 74 of lossy material in the same manner that the discs 15 are mounted in the sections 19 in the plates 11 of the embodiment of FIGS. 1-5. The end sections 73 of the plate shown in FIGS. 6 and 7 are made of metal as is the middle section 75 between the glass sections 71. The ends of the sections 71 which abut with the sections 73 and 75 are beveled to form V-shaped convex surfaces which fit into V-shaped concave surfaces formed on the sections 73 and 75. The beveled edges of the glass sections 71 are silvered to provide V-shaped concave reflecting surfaces at the interfaces between the sections 71 and the sections 73 and between the sections 71 and the section 75. The silver coating on the beveled edges is designated by the reference number 76. The silvered surfaces of the sections 71 are secured to the sections 73 and 75 by rubber cement 78. The V-shaped concave reflecting surfaces at the beveled edges of the section 71 reflects the pump light with greater efficiency into the discs 15 and thus further increases the percentage of the light produced by the flashlamps which enters the discs 15.

It is important that no laser light impinge upon a metallic surface which is in contact with the fluid flowing between the plates because this would cause the metal to contaminate the fluid and interfere with the laser oscillations. When the structure shown in FIGS. 6 and 7 is used, the cooling fluid comes in contact with the metallic sections of the plates. However, these sections are isolated from the laser light end, accordingly contamination of the fluid does not occur.

To minimize reflection of the laser light at the interfaces between the discs and the cooling fluid, the cooling fluid should have the same index of refraction as the discs. Alternatively, the plates containing the discs can be inclined at Brewster's angle as is done in the embodiment illustrated in FIG. 8. As shown in FIG. 8, the plates 11 are inclined at Brewster's angle as are the transparent glass end walls 45 and 47. The remainder of the structure of the embodiment illustrated in FIG. 8 would be the same as that described above. Obviously plates of the type shown in FIG. 3 or plates of the type shown in FIG. 6 could be inclined at Brewster's angle as shown in FIG. 8.

FIGS. 9-14 illustrate how the plates shown in FIG. 6 and 7 are manufactured. As is shown in FIG. 9, a rod 81 of laser material is clad with an annulus 83 of lossy material which in turn is clad with a relatively large annulus 85 of transparent glass. The large annulus is then cut to square it to provide the structure shown in FIG. 10. The squared structure of FIG. 10 is then cut into thin plates as illustrated in FIG. 11. If the embodiment is to have the plates inclined at Brewster's angle then the cutting of the square structure is at Brewster's angle as illustrated in FIG. 11. After the plates have been cut as illustrated in FIG. 11, the edges of the resulting sections are beveled to provide the structure illustrated in FIG. 12, which comprises a disc 72 of laser material surrounded by an annulus 74 of lossy material contained in a section 71 of transparent glass. The beveled edges are then silvered with the coating of silver 76 to provide the structure illustrated in FIG. 13. The silvered edges are then cemented by the layer of rubber cement 78 to the metallic sections 73 and 75 as illustrated in FIGS. 14.

In each of the embodiments described above, the percentage of pump light which enters the laser discs is maximized because of the reflecting surfaces provided in the plates in which the discs of laser glass are mounted. Although in some of the embodiments the reflecting surfaces are V-shaped and in others they are planar, they all extend parallel to the direction from which the pump light irradiates the discs so that a large amount of reflected pump light will enter the laser discs and will not suffer total internal reflection at the curved interfaces of the discs.

Many modifications may be made to the above-described specific embodiments of the invention without departing from the spirit and scope of the invention, which is defined in the appended claims.

I claim:

1. A laser system comprising of elongated plates disposed parallel to one another and spaced from one another whereby coolant can be passed between said plates, each of said plates containing at least one section of laser material, said plates being arranged so that the sections of laser material are aligned on a common axis, means to irradiate said sections of laser material with pump light from a direction perpendicular to the longitudinal dimension of said plates, each of said plates, containing reflecting surfaces running through such plate on opposite sides of the sections of laser material contained by such plate extending parallel to said direction from which said pump light irradiates said sections of laser material so as to reflect some of said pump light into said sections of laser material.

2. A laser system as recited in claim 1 wherein said laser material comprises laser glass.

3. A laser system as recited in claim 1 wherein said laser sections comprise discs of laser glass.

4. A laser system as recited in claim 1 wherein there is provided means to enclose said plates in a container to define parallel channels between said plates, said container including means to direct coolant flow through said channels in a direction parallel to the longitudinal dimension of said plates.

5. A laser system as recited in claim 4 wherein said container comprises top and bottom walls contiguous to the longer edges of said plates, said means to irradiate said sections of laser material with pump light comprising flashlamps extending parallel to the common axis of said sections of laser material above said top wall and below said bottom wall, the portions of said top and bottom wall between said flashlamps and said sections of laser material being transparent to said pump light.

6. A laser system as recited in claim 5 wherein said container comprises sidewalls contiguous with the shorter edges of said plates and wherein said means to direct coolant flow through said channels in a direction parallel to the longitudinal dimension of said plates comprises apertures through said sidewalls communicating with said channels.

7. A laser system as recited in claim 1 wherein each of said plates contains a plurality of sections of laser material spaced apart from one another along the longitudinal dimension of said plates, sad plates being arranged so that said sections of laser material are arranged in a plurality of rows with the sections of each row being aligned on a common axis, and wherein there is provided means to direct coolant flow between said plates in a direction parallel to the longitudinal dimension of said plates and means to establish a laser cavity passing through said rows in series.

8. A laser system as recited in claim 7 wherein said laser material is laser glass.

9. A laser system as recited in claim 7 wherein said sections of laser material are discs of laser glass.

10. A system of as recited in claim 1 wherein said reflecting surfaces are formed by interfaces in said plates between different sections of transparent material having different indices of refraction.

11. A system as recited in claim 1 wherein said reflecting surfaces are concave and are V-shaped.

12. A system as recited in claim 11 wherein said portions of said plates exterior to said reflecting surfaces are metal.

* * * * *